(12) United States Patent
Lee et al.

(10) Patent No.: US 10,290,426 B2
(45) Date of Patent: May 14, 2019

(54) CAPACITOR COMPONENT

(71) Applicant: SAMSUNG ELECTRO-MECHANICS CO., LTD., Suwon-si, Gyeonggi-do (KR)

(72) Inventors: Young Il Lee, Suwon-si (KR); Byeong Cheol Moon, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 13 days.

(21) Appl. No.: 15/689,474

(22) Filed: Aug. 29, 2017

(65) Prior Publication Data

US 2018/0277306 A1    Sep. 27, 2018

(30) Foreign Application Priority Data

Mar. 27, 2017  (KR) .......................... 10-2017-0038371

(51) Int. Cl.
| | | |
|---|---|---|
| *H01G 4/33* | (2006.01) | |
| *H01G 4/228* | (2006.01) | |
| *H01G 4/12* | (2006.01) | |
| *H01G 4/012* | (2006.01) | |

(52) U.S. Cl.
CPC ............. *H01G 4/33* (2013.01); *H01G 4/012* (2013.01); *H01G 4/12* (2013.01); *H01G 4/228* (2013.01)

(58) Field of Classification Search
CPC ................................. H01G 4/30; H01G 4/228

USPC ........................................................ 257/309
See application file for complete search history.

(56) References Cited

U.S. PATENT DOCUMENTS

| 8,084,841 | B2 | 12/2011 | Pulugurtha et al. | |
|---|---|---|---|---|
| 2007/0107774 | A1 | 5/2007 | Jin et al. | |
| 2009/0244808 | A1* | 10/2009 | Ohtsuka .................. | H01G 4/06 361/311 |
| 2011/0244371 | A1 | 10/2011 | Chang et al. | |

FOREIGN PATENT DOCUMENTS

| JP | 2005-026225 A | 1/2005 |
|---|---|---|
| JP | 3644251 B2 | 4/2005 |
| KR | 10-2008-0098083 A | 11/2008 |

OTHER PUBLICATIONS

Korean Office Action issued in corresponding Korean Patent Application No. 10-2017-0038371, dated Jan. 30, 2018, with English Translation.

* cited by examiner

*Primary Examiner* — Eric W Thomas
(74) *Attorney, Agent, or Firm* — Morgan Lewis & Bockius LLP (57) ABSTRACT

A capacitor component includes a substrate, a body disposed on one region of an upper surface of the substrate and having a porous structure, and a capacitor part including a first electrode, a dielectric layer, and a second electrode, formed on the porous structure of the body. The first and second electrodes extend to other regions of the upper surface of the substrate, respectively.

20 Claims, 7 Drawing Sheets

CAPACITOR COMPONENT

CROSS-REFERENCE TO RELATED APPLICATION(S)

This application claims benefit of priority to Korean Patent Application No. 10-2017-0038371 filed on Mar. 27, 2017 in the Korean Intellectual Property Office, the disclosure of which is incorporated herein by reference in its entirety.

TECHNICAL FIELD

The present disclosure relates to a capacitor component.

BACKGROUND

A capacitor may be mounted on printed circuit boards of various electronic products such as display devices including liquid crystal displays (LCDs), plasma display panels (PDPs), and the like, computers, smartphones, mobile phones, and the like, to serve to charge and discharge electricity therein or therefrom. Recently, portable information technology (IT) products such as smartphones, wearable devices, and the like, have been thinned. Therefore, the necessity for thinning a passive element in order to decrease a thickness of an entire package has been increased.

In accordance with this trend, demand for thinner thin-film capacitors has increased. The thin-film capacitor has an advantage in that a thin capacitor may be implemented using thin film technology. Further, the thin-film capacitor has an advantage in that it has low equivalent series inductance (ESL), unlike a multilayer ceramic capacitor according to the related art, such that application of the thin-film capacitor as a decoupling capacitor for an application processor has been considered. In order to use the thin-film capacitor as the decoupling capacitor for the application processor (AP) as described above, the thin-film ceramic capacitor has been manufactured in a form of a land-side capacitor.

Meanwhile, in order to increase capacitance of a capacitor within a restricted space, a trench type capacitor has been developed. Such a trench type capacitor is manufactured by a method of forming a trench in a silicon substrate and then forming a capacitor structure. The trench type capacitor as described above is suitable for increasing a surface area of an electrode to increase capacitance, but there are problems in that a complicated semiconductor process technology is required, and in consideration of a dielectric thickness satisfying a withstand voltage conditions, it is difficult to form a plurality of dielectrics in the trench, such that it is difficult to implement super-high capacitance.

SUMMARY

An aspect of the present invention may provide a capacitor component capable of implementing super-high capacitance by using a substrate having a surface area increased as compared to a trench type capacitor, and capable of being efficiently manufactured without using a semiconductor process.

According to an aspect of the present disclosure, a capacitor component may include: a substrate; a body disposed on one region of an upper surface of the substrate and having a porous structure; and a capacitor part disposed on the porous structure of the body, and including a first electrode, a second electrode, and a dielectric layer disposed between the first and second electrodes. The first and second electrodes extend to other regions of the upper surface of the substrate, respectively.

The first electrode may be coated on a surface of the body.

The dielectric layer may be coated on a surface of the first electrode.

The second electrode may be coated on a surface of the dielectric layer.

Portions of the first and second electrodes extending to other regions of the upper surface of the substrate may form first and second terminal electrodes, respectively.

The capacitor component may further include first and second plating electrodes disposed on the first and second terminal electrodes, respectively.

The first and second plating electrodes may be higher than the body with reference to the upper surface of the substrate.

The substrate and the body may be formed of ceramic.

The body may have an aggregate shape of a plurality of particles.

The substrate may have a partition wall part enclosing the body.

The first and second electrodes may extend from an inner side wall of the partition wall part to an upper surface of the partition wall.

The capacitor component may further include first and second plating electrodes disposed on first and second terminal electrodes, respectively.

The partition wall part may be formed to be higher than the body.

The capacitor component may further include an insulating protection layer covering the body and the capacitor part.

The body may be mainly formed of ceramic but partially contain a polymer ingredient.

The capacitor part may include a plurality of dielectric layers, and at least one of the first and second electrodes may be provided in plural in the capacitor part.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

Figure 1:
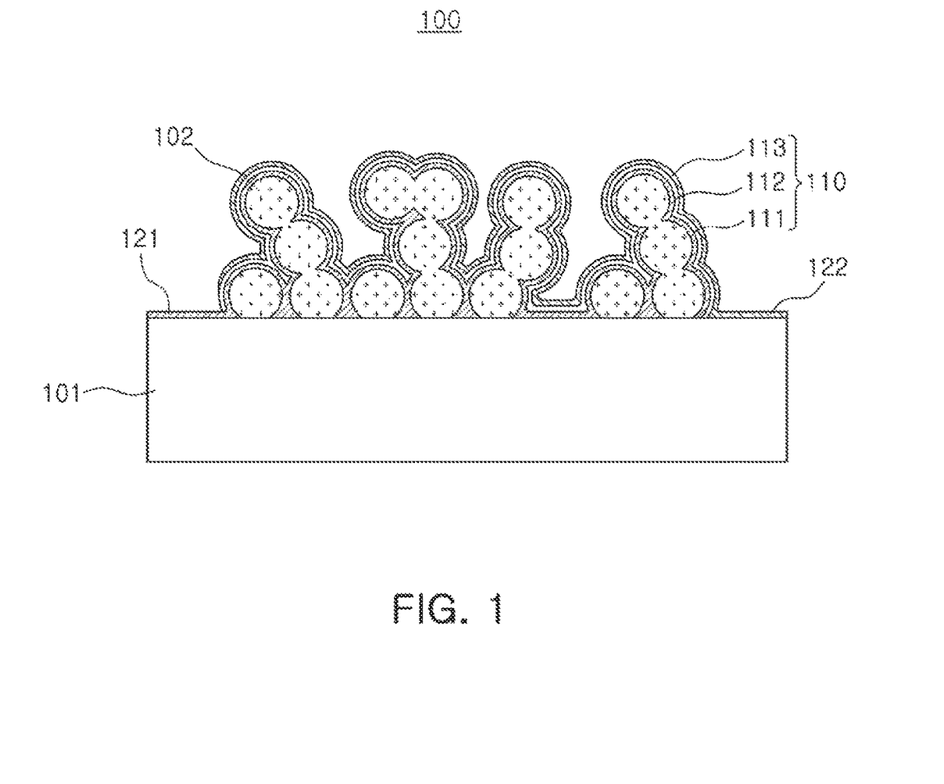
FIG. 1 is a cross-sectional view schematically illustrating a capacitor component according to an exemplary embodiment in the present disclosure.
Figure 2:
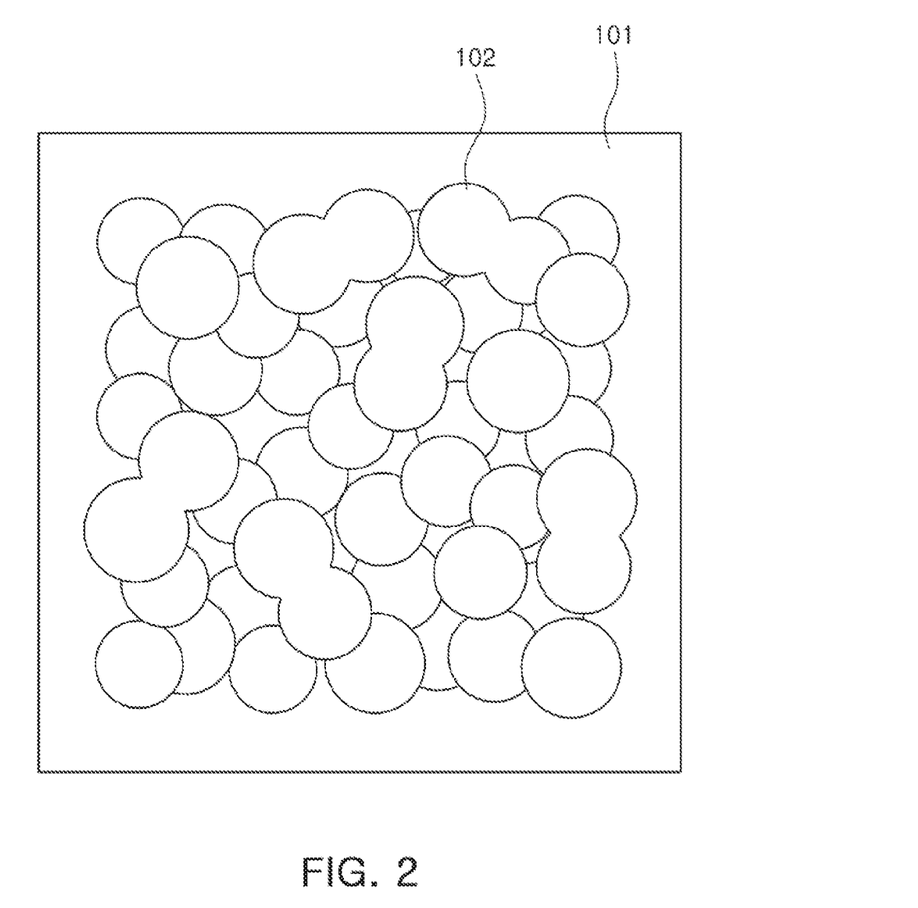
FIG. 2 is an upper plan view illustrating shapes of a substrate and a body in the capacitor component of FIG. 1.
Figure 3:
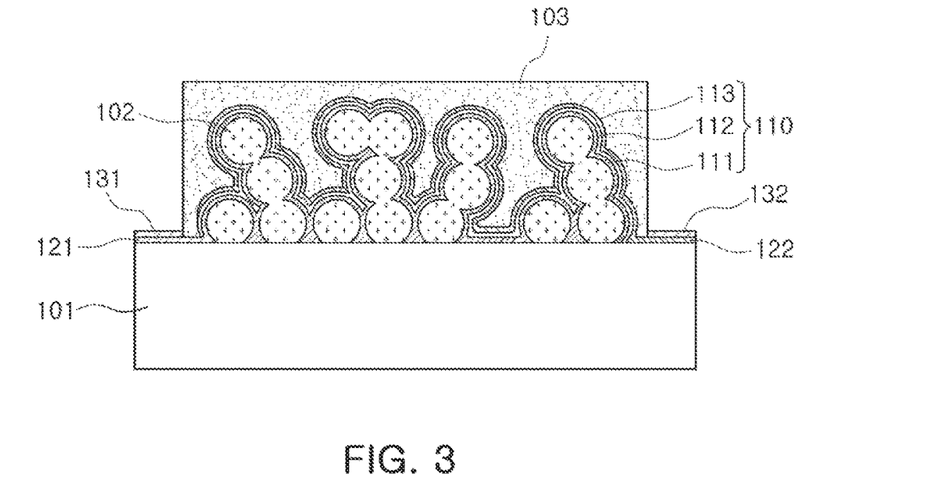
FIGS. 3 through 6 illustrate capacitor components according to modified exemplary embodiments.

FIG. 1 is a cross-sectional view schematically illustrating a capacitor component according to an exemplary embodiment in the present disclosure. FIG. 2 is a plan view illustrating shapes of a substrate and a body in the capacitor component of FIG. 1.

Referring to FIGS. 1 and 2, a capacitor component 100 according to the exemplary embodiment in the present disclosure may include a substrate 101, a body 102 having a porous structure, and a capacitor part 110 formed on the porous structure. First and second electrodes 111 and 113 of the capacitor part 110 may extend to a region on which the body 102 is not disposed to form first and second terminal electrodes 121 and 122, respectively.

The substrate 101, a region supporting the body 102, the capacitor part 110, the first and second electrodes 111 and 113, and the like, may be formed of a material capable of performing a support function as described above. For example, the substrate 101 may be formed of a ceramic, a polymer, a metal, or the like. Here, in a case in which the substrate 101 is formed of the metal, an additional insulating layer may be required on an upper surface of the substrate. In a case in which the substrate 101 is formed of the ceramic, the substrate 101 may be formed of the same material as that of the body 102, such that an influence caused by difference in physical properties between heterogeneous materials may be removed, and process efficiency may be secured. A ceramic material suitable for being used in the substrate 101 may be, for example, alumina, and at the time of manufacturing the capacitor component, a plate-shaped alumina substrate may be used, or a method of forming an alumina green sheet on a carrier film, or the like, may be used. In this case, the substrate 101 may also be formed of another ceramic material, for example, a barium titanate ($BaTiO_3$) based material, a strontium titanate ($SrTiO_3$) based material, or the like, as well as alumina.

The body 102 may be disposed on one region of an upper surface of the substrate 101 and have the porous structure. Since a surface area of the body 102 may be increased by this porous structure, a capacitor component 100 having high capacitance may be implemented by forming the capacitor part 110 in the porous structure. Further, a manufacturing process may be simple as compared to a manufacturing process of a trench type capacitor, and high capacitance may be implemented. As an example, the body 102 may be formed of the same material as that of the substrate 101. For example, the body 102 may be formed of ceramic such as alumina. The body may have an aggregate shape of a plurality of particles as illustrated in FIG. 2, and the porous structure may be effectively implemented by the aggregate shape. The aggregate shape as described above may be obtained by sintering ceramic particles while adjusting conditions such as a sintering temperature, and the like, so that the ceramic particles are not completely densified.

The capacitor part 110 may include the first and second electrodes 111 and 113 and a dielectric layer 112 disposed therebetween. More specifically, as illustrated in FIG. 1, the first electrode 111 may be coated on a surface of the body 102, the dielectric layer 112 may be coated on a surface of the first electrode 111, and the second electrode 113 may be coated on a surface of the dielectric layer 112. In this case, since pores of the porous structure have fine sizes, constituents configuring the capacitor part 110 may be effectively formed by an atomic layer deposition (ALD) method. However, another coating method capable of being applied to the pores of the porous structure may also be used in addition to the atomic layer deposition (ALD) method.

As an example, the first and second electrodes 111 and 113 may be formed of a metal having excellent electric conductivity such as Ag, Cu, Pt, Ni, or the like. Further, the dielectric layer 112 may be formed of a material such as alumina ($Al_2O_3$), $SiO_2$, $Sn_3N_4$, $ZrO_2$, $CaTiO_3$, $SrTiO_3$, (Ba, Sr)$TiO_3$, $BaTiO_3$, or the like, and formed of a single material or a plurality of materials. In this case, insulation characteristics may be increased by forming the dielectric layer 112 using the plurality of materials.

As illustrated in FIG. 1, portions of the first and second electrodes 111 and 113 extending to other regions of the upper surface of the substrate 101 may form the first and second terminal electrodes 121 and 122, respectively. The body 102 may be disposed on the center of the upper surface of the substrate 101, and the first and second terminal electrodes 121 and 122 may be disposed on outer side portions of the upper surface of the substrate 101 as in the present exemplary embodiment. An electrical connection structure with another element, a substrate, or the like, may be effectively implemented by separately disposing the terminal electrodes 121 and 122 around the body 102.

FIGS. 3 through 6 illustrate capacitor components according to modified exemplary embodiments. First, in the exemplary embodiment illustrated in FIG. 3, a protection layer 103 is added as compared to the exemplary embodiment illustrated in FIG. 1. The protection layer 103 may cover a body 102 and a capacitor part 110 to protect the body 102 and the capacitor part 110 and be implemented by applying a material such as an oxide, a polymer, or the like. Moreover, first and second plating electrodes 131 and 132 may be disposed on the first and second terminal electrodes 121 and 122, respectively. The first and second plating electrodes 131 and 132 may include one or more layers, and contain, for example, a material such as Ni, Sn, Au, or the like.

Figure 4:
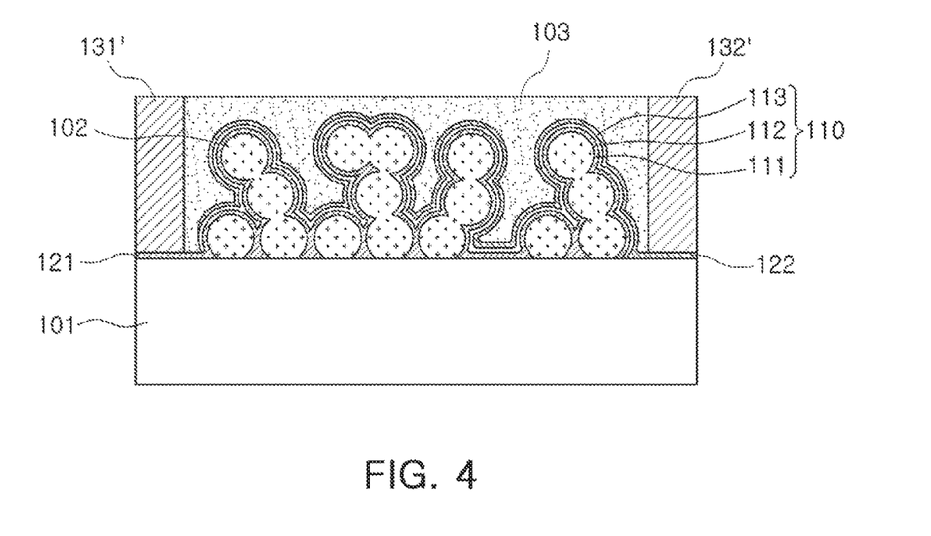

Next, the modified exemplary embodiment illustrated in FIG. 4 is different in terms of shapes of first and second plating electrodes 131' and 132' from those in the above-mentioned exemplary embodiment. In detail, the first and second plating electrodes 131' and 132' may be formed to be higher than a body 102. A structure suitable for being mounted on a circuit board, or the like, may be provided by increasing a thickness of the first and second plating electrodes 131' and 132' so that the first and second plating electrodes 131' and 132' are formed to be higher than the body 102. Further, the body 102, which may be structurally weak, may be protected by the first and second plating electrodes 131' and 132', formed to be relatively high.

Figure 5:
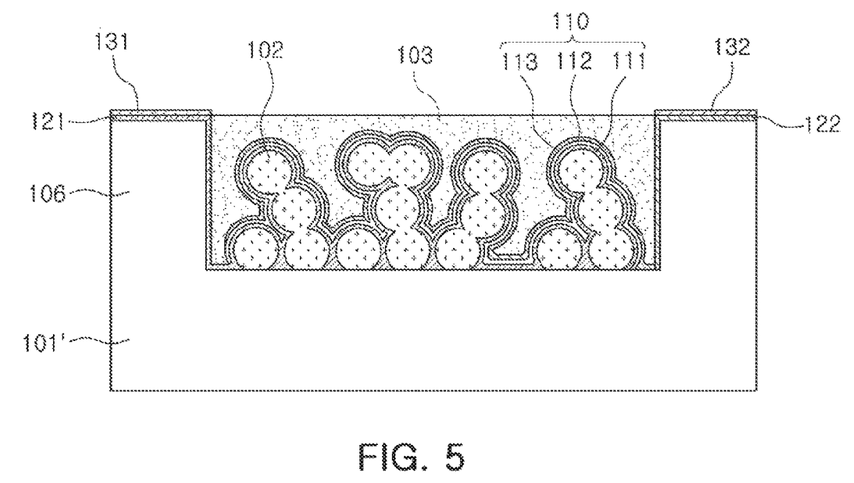

Next, in the exemplary embodiment illustrated in FIG. 5, a substrate 101' may have a partition wall part 106 enclosing a body 102. First and second electrodes 111 and 113 may extend from an inner side wall of the partition wall part 106 to the upper surface thereof, and first and second terminal electrodes 121 and 122 may be formed on an upper surface of the partition wall part 106. In addition, first and second plating electrodes 131 and 132 may be formed on the first and second terminal electrodes 121 and 122, respectively. The partition wall part 106 may be formed of the same material as that in the substrate 101'. For example, the partition wall part 106 may be formed of a ceramic such as alumina, or the like. However, another material may be used according to exemplary embodiments. The body 102, which may be structurally weak, may be effective protected by using the partition wall part 106. In this case, as illustrated in FIG. 5, the partition wall part 106 may be formed to be higher than the body 102 in order to suitably perform a protection function. The partition wall part 106 as described above may be formed by a method of applying a ceramic paste to the substrate 101' before or after forming the body 102, a method of partially removing a central portion of an upper surface of the substrate 101, or the like.

Figure 6:
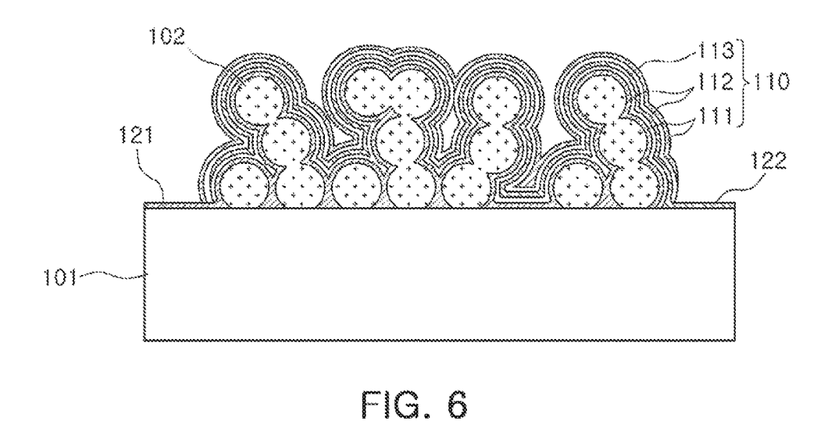

Meanwhile, in the above-mentioned exemplary embodiments, a structure in which a single first electrode 111, a single second electrode 113, and a single dielectric layer 112 are present in the capacitor part 110 is illustrated, but as in the exemplary embodiment illustrated in FIG. 6, a capacitor part 110 may have a plurality of electrodes 111 and 113 and a plurality of dielectric layers 112. The modified exemplary embodiment illustrated in FIG. 6 corresponds to a structure in which the number of first electrodes 111 is two, the number of second electrodes 113 is one, and the number of dielectric layers 112 is two. However, if necessary, in order to adjust capacitance, or the like, the numbers of electrodes 111 and 113 and the number of dielectric layers 112 may be increased. Capacitance of the capacitor component 100 may be further increased by increasing the numbers of electrodes 111 and 113 in addition to the porous structure of the body 102.

Hereinafter, an example of a manufacturing process of a capacitor component having the above-mentioned structure will be described. Structural features of the capacitor component will be more clearly understood from a description of the manufacturing process to be provided below.

Figure 7:
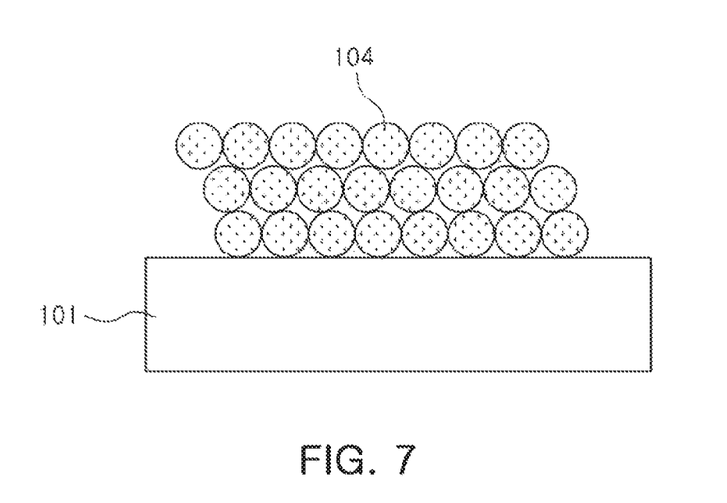
FIGS. 7 through 11 illustrate a manufacturing process of the capacitor component according to the exemplary embodiment in the present disclosure.

First, as illustrated in FIG. 7, a plurality of particles 104 may be formed on the substrate 101. The plurality of particles 104 may be formed of a material capable of being densified by sintering to form a porous structure, for example, a ceramic material, and further contain another ingredient, for example, glass frit promoting sintering, or the like, as needed. The plurality of particles 104 may be applied to or printed on the substrate 101, and if necessary, an application or printing thickness may be adjusted by repeating the applying or printing.

Figure 8:
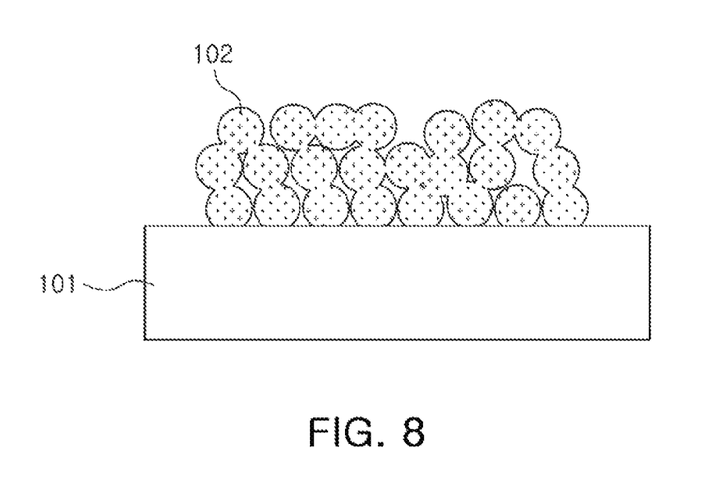

Then, the plurality of particles 104 may be sintered to thereby be densified, and the substrate 101 may also be sintered together with the plurality of particles. FIG. 8 illustrates a state in which the plurality of particles 104 form aggregates to thereby form the body 102, and the body 102 may have the porous structure by aggregation of the particles 104. In case in which the particles 104 are completely densified, it is not preferable in view of formation of the porous structure. Conditions such as a sintering temperature, a sintering time, and the like, may be adjusted so that the particles are not completely densified. For example, a method of lowering the sintering temperature and decreasing the sintering time as compared to a case of sintering a completely densified ceramic layer according to the related art may be used.

Figure 9:
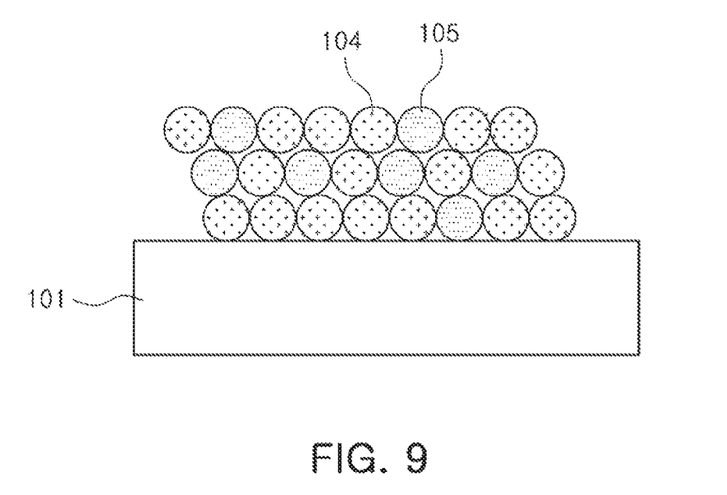
Figure 10:
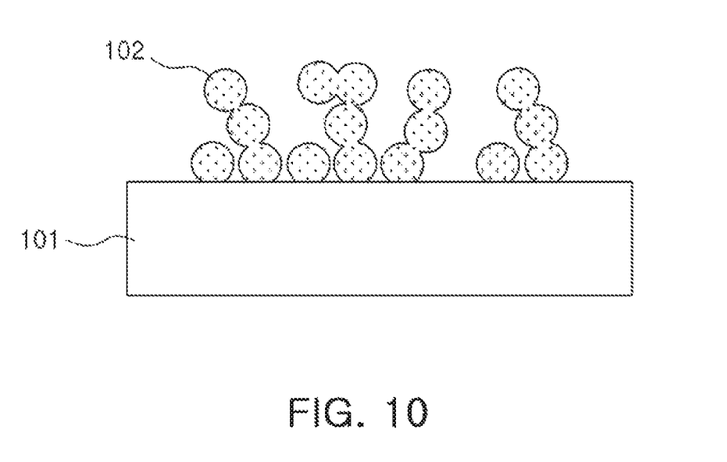

The above-mentioned process may be partially modified in order to allow the porous structure of the body 102 to have a larger number of pores and an enlarged surface. This will be described with reference to FIGS. 9 and 10. In a process of a modified example, polymer beads 105 may be disposed between a plurality of particles 104. The polymer bead 105 as described above may be mainly formed of an acrylic ingredient, and a state in which the polymer beads 105 are mixed with the ceramic particles 104 and applied in a paste form is illustrated in FIG. 9. At the time of performing the sintering in the state in which the polymer beads 105 are applied as described above, spaces occupied by the polymer beads 105 may remain as pores as illustrated in FIG. 10, such that the body 102 may have a larger number of pores and enlarged surfaces, and a capacitor part manufactured using this body 102 may have higher capacitance. In this case, at the time of performing the sintering, not all of the polymer beads 105 may be always removed, but polymer ingredients may partially remain in the body 102 even after the sintering.

Figure 11:
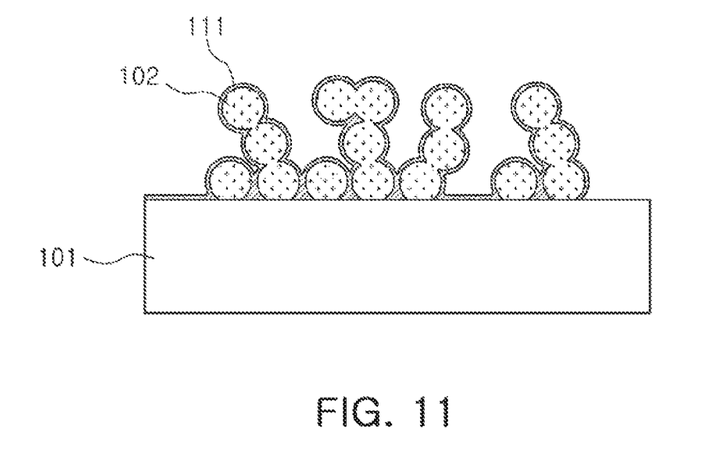

After the porous body 102 is formed by the sintering, the first electrode 111 may be formed on a surface of the body 102 as illustrated in FIG. 11. The first electrode 111 may be formed using various methods such as a deposition method, a liquid phase method, and the like, but considering that the pores of the porous structure have fine sizes, the first electrode 111 may be effectively formed in a case of using an atomic layer deposition method. Then, the dielectric layer 112 and the second electrode 113 may also be formed by the atomic layer deposition method, or the like, on the first electrode 111, such that the capacitor component 100 having a shape illustrated in FIG. 1 may be implemented.

As set forth above, the capacitor component having super-high capacitance may be implemented by using the substrate having a surface area further increased as compared to the trench type capacitor. Further, the capacitor component as described above may be efficiently manufactured without using a semiconductor process.

While exemplary embodiments have been shown and described above, it will be apparent to those skilled in the art that modifications and variations could be made without departing from the scope of the present invention as defined by the appended claims.

What is claimed is:

1. A capacitor component comprising:
a substrate;
a body disposed on one region of a surface of the substrate and having a porous structure; and
a capacitor part disposed on the porous structure of the body, and including a first electrode, a second electrode, and a dielectric layer disposed between the first and second electrodes,
wherein the first and second electrodes extend to other regions of the surface of the substrate, respectively, and the body has an aggregate shape of a plurality of particles.

2. The capacitor component of claim 1, wherein the first electrode is coated on a surface of the body.

3. The capacitor component of claim 2, wherein the dielectric layer is coated on a surface of the first electrode.

4. The capacitor component of claim 3, wherein the second electrode is coated on a surface of the dielectric layer.

5. The capacitor component of claim 1, wherein portions of the first and second electrodes extending to other regions of the surface of the substrate form first and second terminal electrodes, respectively.

6. The capacitor component of claim 5, further comprising first and second plating electrodes disposed on the first and second terminal electrodes, respectively.

7. The capacitor component of claim 6, wherein the first and second plating electrodes are higher than the body with reference to the surface of the substrate.

8. The capacitor component of claim 1, wherein the substrate and the body are formed of ceramic.

9. The capacitor component of claim 1, wherein the substrate has a partition wall part enclosing the body.

10. The capacitor component of claim 9, wherein the first and second electrodes extend from an inner side wall of the partition wall to an upper surface of the partition wall.

11. The capacitor component of claim 10, wherein portions of the first and second electrodes extending to the upper surface of the partition wall form first and second terminal electrodes, respectively, and
further comprising first and second plating electrodes disposed on the first and second terminal electrodes, respectively.

12. The capacitor component of claim 9, wherein the partition wall part is formed to be higher than the body.

13. The capacitor component of claim 1, further comprising an insulating protection layer covering the body and the capacitor part.

14. The capacitor component of claim 1, wherein the body is mainly formed of ceramic but partially contains a polymer ingredient.

15. The capacitor component of claim 1, wherein the capacitor part includes a plurality of dielectric layers, and at least one of the first and second electrodes is provided in plural in the capacitor part.

16. A capacitor component comprising:
a substrate;
a body disposed on one region of a surface of the substrate and having a porous structure; and
a capacitor part disposed on the porous structure of the body, and including a first electrode, a second electrode, and a dielectric layer disposed between the first and second electrodes,
wherein the first and second electrodes extend to other regions of the surface of the substrate, respectively, and
the first electrode covering the body has a curved shape randomly fluctuating along the upper surface of the substrate.

17. A capacitor component comprising:
a substrate;
a body protruding from a surface of the substrate and having a porous structure; and
a capacitor part disposed on the porous structure of the body, and including a first electrode, a second electrode, and a dielectric layer disposed between the first and second electrodes,
wherein the first and second electrodes include first and second extension portions extending at least to first and second regions of the surface of the substrate, respectively, and physically contacting with the first and second regions of the surface of the substrate, respectively.

18. The capacitor component of claim 17, wherein the first electrode is coated on a surface of the body, the dielectric layer is coated on a surface of the first electrode, and the second electrode is coated on a surface of the dielectric layer.

19. The capacitor component of claim 18, wherein portions of the first electrode covering the body have a curved shape randomly fluctuating along the surface of the substrate.

20. The capacitor component of claim 17, wherein the body has an aggregate shape of a plurality of particles.

* * * * *